US011994296B2

(12) United States Patent
Delanaye et al.

(10) Patent No.: US 11,994,296 B2
(45) Date of Patent: May 28, 2024

(54) COMBUSTION DEVICE HAVING A FLAMELESS COMBUSTION CHAMBER, USE OF SUCH A DEVICE AND ELECTRICITY PRODUCTION OR ENERGY COGENERATION APPARATUS COMPRISING SUCH A DEVICE

(71) Applicants: MITIS S.A., Hannut (BE); UNIVERSITE LIBRE DE BRUXELLES, Brussels (BE)

(72) Inventors: Michel Delanaye, Hannut (BE); Alessandro Parente, Brussels (BE)

(73) Assignees: MITIS S.A., Hannut (BE); UNIVERSITE LIBRE DE BRUXELLES, Brussels (BE)

( * ) Notice: Subject to any disclaimer, the term of this patent is extended or adjusted under 35 U.S.C. 154(b) by 0 days.

(21) Appl. No.: 18/034,119

(22) PCT Filed: Sep. 13, 2021

(86) PCT No.: PCT/EP2021/075110
§ 371 (c)(1),
(2) Date: Apr. 27, 2023

(87) PCT Pub. No.: WO2022/089822
PCT Pub. Date: May 5, 2022

(65) Prior Publication Data
US 2023/0392790 A1    Dec. 7, 2023

(30) Foreign Application Priority Data
Oct. 30, 2020  (BE) .................................. 2020/5775

(51) Int. Cl.
*F23R 3/00* (2006.01)
*F02C 3/14* (2006.01)
(Continued)

(52) U.S. Cl.
CPC .................. *F23R 3/16* (2013.01); *F02C 3/14* (2013.01); *F23R 3/54* (2013.01); *F05D 2250/82* (2013.01)

(58) Field of Classification Search
None
See application file for complete search history.

(56) References Cited

U.S. PATENT DOCUMENTS

2005/0155351 A1* 7/2005 Wunning .................. F23R 3/42
60/750
2005/0277074 A1* 12/2005 Zinn ....................... F23C 9/006
431/9
2007/0022758 A1* 2/2007 Myers ..................... F02C 3/145
60/776

FOREIGN PATENT DOCUMENTS

CN       203907671 U    10/2014
CN       105299692 B    9/2017
WO    WO 03091626 A1    11/2003

* cited by examiner

*Primary Examiner* — Edwin Kang
(74) *Attorney, Agent, or Firm* — LEYDIG, VOIT & MAYER, LTD.

(57) ABSTRACT

A combustion device for an electricity production or energy cogeneration apparatus, the apparatus comprising a gas turbine supplied by the device, the device being suitable for a combustion regime of a "flameless" type, the device including: an outer tube; and a combustion tube forming a combustion zone for flameless combustion of a mixture of oxidizing air and fuel, the combustion tube being concentric with the outer tube, in communication with fuel-injection means, and with air-injection means arranged at a first end of the combustion tube, referred to as a front end, and which is closed by an end wall at a second end of the combustion tube, referred to as a rear end, the end wall being secured to the combustion tube and fluidtight, the fuel-injection means including at least a first orifice, referred to as a fuel-injection (Continued)

orifice, the air-injection means including at least a second orifice.

24 Claims, 8 Drawing Sheets

(51) Int. Cl.
*F23R 3/16* (2006.01)
*F23R 3/54* (2006.01)

COMBUSTION DEVICE HAVING A FLAMELESS COMBUSTION CHAMBER, USE OF SUCH A DEVICE AND ELECTRICITY PRODUCTION OR ENERGY COGENERATION APPARATUS COMPRISING SUCH A DEVICE

CROSS-REFERENCE TO PRIOR APPLICATIONS

This application is a U.S. National Phase application under 35 U.S.C. § 371 of International Application No. PCT/EP2021/075110, filed on Sep. 13, 2021, and claims benefit to Belgian Patent Application No. BE 2020/5775, filed on Oct. 30, 2020. The International Application was published in French on May 5, 2022 as WO/2022/089822 under PCT Article 21(2).

FIELD

The present invention relates to a combustion device and to an electricity-production or energy-cogeneration apparatus comprising said device. What is meant by a combustion device is a device comprising one or more combustion chambers or sub-chambers.

In particular, the invention relates to a combustion system operating in the "flameless" regime for example using a gaseous fuel coupled with a heat recuperator and incorporated into a gas microturbine running on natural gas.

BACKGROUND

It is known that a combustion chamber supplying a turbine operating in the "flameless" oxidation (or FLOX®) regime is able to achieve extremely low NOx emissions, for example of <10 ppm.

Flameless combustion referred to as "MILD combustion" (MILD being the acronym for Moderate or Intense Low-oxygen Dilution) is a mode of combustion capable of providing high combustion efficiency with very low pollutant emissions, even with a high degree of preheating of the air. In addition to the improved energy efficiency associated with the heat recuperation process, MILD combustion thus provides a homogeneous combustion environment as a consequence of the intense recirculation of the exhaust gases. This manifests itself in a localized reduction in the $O_2$ level, leading to a distributed reaction zone and to a reduction in working temperatures by comparison with conventional combustion with a visible flame. The reduced temperature levels and the homogeneous reaction environment have positive effects on the formation of pollutants (NOx, soot) which is considerably reduced, and on the resistance of the materials, thanks to the absence of steep temperature gradients. MILD combustion allows a great deal of flexibility in fuel type, which makes it an ideal technology for the following fuels: fuels of low calorific value, industrial waste of high calorific value, hydrogen-based fuels, liquid fuels (for example kerosene, petroleum, diesel, heavy oil) and solid fuels.

From a chemistry-turbulence interaction viewpoint, MILD combustion is characterized by a high level of coupling between the chemical reaction timescale and the fluid transport phenomena. The Damköhler number Da (the ratio between the fluid transport phenomena rate and the chemical reaction timescale) in MILD combustion is of the order of one, indicating that the chemical reaction times are not insignificant by comparison with the timescales governing the transport of the fluids.

In conventional combustion, the overall process is controlled by the heat and mass transfers, which leads to a well-defined reaction region with steep temperature and species gradients and Da values greater than one. In flameless combustion, the recirculation of the exhaust gases (also referred to as combustion gases) therefore leads to a more homogeneous distribution of the temperature and of the species.

In general, flameless combustion is very stable and quiet and could therefore be used for applications with gas turbines where conventional operations may lead to thermal-acoustic instabilities ("hum") and significant stresses.

Flameless combustion chamber designs for gas (micro-)turbine applications are known. In a gas microturbine application, the temperature of the flue gases leaving the combustion chamber is limited by the tolerance of the material used for manufacturing the turbine, typically from 800° C. to 1050° C., and particularly from 950° C. to 1050° C. This condition forces the use of an excess of air that is very substantial by comparison with the stoichiometric quantity of air needed to burn the fuel.

In the applications to which the present invention relates, the lambda ratio (air mass flow rate/stoichiometric air mass flow rate or 1+excess air) may be very high (significantly greater than 1) so as to make it possible to reduce the temperature of the gases to a temperature compatible with the turbine inlet. The result of this is that there is a large quantity of $O_2$ available for combustion, which seems antagonistic with the ideal conditions for implementing flameless combustion which are dependent mainly on the dilution of $O_2$ in the mixture.

Moreover, another condition that is favorable to the onset of flameless combustion concerns the preheating of the oxidizing air to a temperature high enough to ensure easy auto-ignition of the mixture. The use of a heat recuperator present in the gas turbine cycle along with regeneration is advantageous in achieving this functionality.

Numerous designs of combustion chamber capable of operating in a flameless regime have been proposed. Mention may for example be made of the gas turbine combustion chamber described in document WO 2003/091626. This chamber is configured in such a way as to have an inner guide tube open at both ends and that allows a significant proportion of the combustion gases to be recirculated in the chamber, the other proportion of the gases being discharged downstream of the chamber. This recirculation makes it possible to maintain a flameless oxidizing regime in the chamber. These known solutions do admittedly make it possible to achieve low NOx levels, but they are not designed to achieve low CO levels.

Document CN105299692A discloses a combustion chamber device for equipment for disinfecting flue gases over a large area and for preventing epidemics. The combustion chamber device comprises a flame tube, a diffusion section, an air-distribution plate, cold air sleeving and fuel-gas sleeving, a cooling (or gas-return) tube and an outer casing. The flame barrel is welded to the air-inlet end face in the fuel-gas sleeving by means of four support plates. The fuel-gas sleeving is bolted to the air-distribution plate. The diffusion section is arranged on the outside of the flame barrel via a sheath and is installed fixed to the air-distribution plate and to the conditioned-air sleeving using bolts. The air enters from the diffusion section, a proportion entering the combustion chamber for combustion and a proportion entering the zone between the flame tube and the fuel-gas sleeving so as to be mixed with the flame at high temperature, and a proportion enters the air-distribution orifice on the air-distribution plate and mixes with the flow of high-temperature and high-velocity air coming from the gas-return tube in the cold air tube in order to obtain an air flow suitable for atomization. The injected disinfectant therefore forms a mist which is atomized at the exit from the apparatus.

The cooling tube is concentric with the fuel-gas sleeving so that the path of the fuel gas is lengthened, and the mixing time is extended, but with a total structure length that is considerably reduced.

SUMMARY

In an embodiment, the present invention provides a combustion device for an electricity production or energy cogeneration apparatus, the apparatus comprising a gas turbine supplied by the device, the device being suitable for a combustion regime of a "flameless" type, the device comprising: an outer tube; a combustion tube forming a combustion zone for flameless combustion of a mixture of oxidizing air and fuel, the combustion tube being concentric with the outer tube, in communication with fuel-injection means, and with air-injection means arranged at a first end of the combustion tube, referred to as a front end, and which is closed by an end wall at a second end of the combustion tube, referred to as a rear end, the end wall being secured to the combustion tube and fluidtight, the fuel-injection means comprising at least a first orifice, referred to as a fuel-injection orifice, the air-injection means comprising at least a second orifice, referred to as an air-injection orifice; means for discharging the combustion gases; and a closure wall covering the front end of the combustion tube and connected to the air-injection and fuel-injection means, wherein the combustion tube substantially comprises a cylinder with a single internal volume configured to allow the gases to recirculate in a flameless-combustion regime, wherein the combustion-gases discharge means comprise at least one opening arranged at the front end of the combustion tube substantially of a cylindrical shape, the opening being delimited on one hand by one end of a longitudinal cylindrical wall of the combustion tube proximal to the closure wall and, on another hand, by the closure wall, a flow and discharge of the combustion gases being performed between the longitudinal wall and the outer tube, and wherein the combustion device further comprises a tubular sleeve arranged concentrically between the combustion tube and the outer tube, connected to the closure wall and positioned facing the opening of the discharge means so as to form an annular recombination zone, to extend a residence time of the combustion gases exhausted via the opening.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows an (external) perspective view of a flameless combustion device according to the invention.

FIG. 2 depicts a three-dimensional view in longitudinal section of the flameless combustion device according to the invention.

FIG. 3 shows a three-dimensional view in transverse section of the flameless combustion device according to the invention, the section being made through the plenum.

FIG. 4 shows two perspective views of the fuel-injection and air-injection orifices of the flameless combustion device according to the invention.

FIG. 5 is a schematic depiction in longitudinal section of the flameless combustion device according to the invention, with the flows being indicated by arrows.

FIG. 6 is a schematic depiction (in the form of a cycle) of the energy-cogeneration apparatus according to the invention.

FIG. 7 is a diagram showing, in longitudinal section, the distribution of the temperature field.

FIG. 8 is a diagram showing, in longitudinal section, the distribution of the velocity field.

FIG. 9 is a diagram showing, in longitudinal section, the distribution of the CO field.

FIG. 10 is a diagram showing, in longitudinal section, the distribution of the OH field.

DETAILED DESCRIPTION

In an embodiment, the present invention overcomes at least one of the disadvantages of the aforementioned prior art, particularly that the exhaust gases leaving the combustion device have not only low NOx levels (for example <10 mg/kWh[1], preferably <5 mg/kWh) but also a low CO level (for example <10 mg/kWh).

In an embodiment, the present invention provides a combustion device that is stable and highly efficient in terms of output, configured to produce combustion (exhaust) gases compatible with an inlet temperature of between 800° and 1050° C., particularly between 950° and 1050° C., while keeping the NOx and CO levels low like those mentioned above.

In an embodiment, the present invention provides a combustion device that makes it possible to accommodate high lambda (excess air) values while at the same time allowing flameless combustion to occur.

In an embodiment, the present invention provides a combustion device for an electricity production or energy cogeneration apparatus, said apparatus comprising a gas turbine, particularly a gas microturbine, supplied by said device, said device being suitable for a combustion regime of the "flameless" type and comprising:

- an outer tube;
- a combustion tube, forming a combustion zone suitable for the flameless combustion of a mixture of oxidizing air and of fuel, said combustion tube being concentric with the outer tube, in communication with fuel-injection means and with air-injection means which are arranged at a first end of the combustion tube, referred to as front end, and which is closed by an end wall at a second end of the combustion tube, referred to as rear end, said end wall being secured to said combustion tube and fluidtight;
- the fuel-injection means comprising at least a first orifice, referred to as fuel-injection orifice;
- the air-injection means comprising at least a second orifice, referred to as air-injection orifice;
- means for discharging the combustion gases;
- a closure wall covering the front end of the combustion tube and connected to the air-injection and fuel-injection means;

[1] mg/kWh at 0% $O_2$, kWh=energy injected on the basis of LCV of the fuel characterized in that:
the combustion tube is substantially in the form of a cylinder with a single internal volume able to allow the gases to recirculate in a flameless-combustion regime;
the combustion-gases discharge means comprise at least one opening arranged at the front end of the combustion tube substantially of cylindrical shape, said opening being delimited on the one hand by one end of the longitudinal cylindrical wall of the combustion tube proximal to the closure wall and, on the other hand, by said closure wall, the flow and discharge of the combustion gases being performed between said longitudinal wall and the outer tube.

According to advantageous embodiments of the invention, the combustion device comprises one or more of the following technical features, in any possible combination:
the combustion device further comprises a tubular sleeve arranged concentrically between the combustion tube and the outer tube, connected to the closure wall and positioned facing the opening of the discharge means so as to form an annular zone, referred to as the recombination zone, making it possible to extend the residence time of the combustion gases being exhausted via the opening;
the outer tube delimits, at least in part with the combustion tube, an annular passage referred to as a bypass allowing the passage of a flow of dilution air which is able to mix with the combustion gases downstream of the combustion zone, the closure wall comprising one or several openings, referred to as bypass openings, formed in its periphery and via which the flow of dilution air enters the bypass;
the outer tube delimits, at least in part with the tubular sleeve, an annular passage referred to as a bypass allowing the passage of a flow of dilution air which is able to mix with the combustion gases downstream of the recombination zone, the closure wall comprising one or several openings, referred to as bypass openings, formed in its periphery and via which the flow of dilution air enters the bypass;
the tubular sleeve extends axially over at least 50% of the length of the combustion tube;
the combustion device comprises a plenum of cylindrical shape formed in part by a portion of the outer tube and by the closure wall, said portion being arranged at a front end of the outer tube, said closure wall forming an end wall of said plenum;
the plenum is fluidically connected to an air-supply duct;
the opening of the combustion-gases discharge means is an annular opening formed between the closure wall and the front edge of the combustion tube;
the fuel-injection orifice is an orifice centered with respect to the combustion tube;
the fuel-injection means comprise an injection head in which the fuel-injection orifice is formed;
the fuel-injection means comprise a fuel-injection tube the rear end of which is secured to the injection head;
the air-supply duct and the fuel-injection tube are, over part of their respective lengths, arranged coaxially;
the air-injection orifice is made up of several orifices arranged in the closure wall;
the air-injection orifice encircles the fuel-injection orifice;
the air-injection means comprise an injection ring fixed to the closure wall;
the injection ring comprises an inner surface guiding a flow of air entering the combustion zone;
the air-injection means further comprise a guide element arranged at the center of the injection ring;
the guide element comprises an outer surface guiding the flow of air entering the combustion zone, a portion of said outer surface being of substantially conical shape;
the guide element and the injection ring are connected by one or more profiled arms;
the guide element coincides with the fuel-injection head;
the combustion device comprises a convergent conical tube secured to the outer tube for discharging the combustion gases.

The invention also relates to the use of the combustion device described hereinabove, characterized in that a flow of air is injected into the device with a velocity of between 60 and 120 m/s, so as to obtain a fluid recirculation ratio mE/(mA+mF) greater than 1.3 where mE, mA and mF respectively denote the mass flow rates of the gases burnt and recirculated in the combustion zone, and of oxidizing air and of fuel which are introduced into the combustion zone (4).

The present invention also relates to an electricity-production or energy-cogeneration apparatus comprising a combustion device as described hereinabove.

Advantageously, the electricity-production or energy-cogeneration apparatus comprises a heat exchanger for recuperating heat energy from the combustion gases produced in the combustion device in order to preheat the intake air supplied to the combustion device.

As a preference, the heat exchanger comprises a first circuit in fluidic communication with a section downstream of a turbine, particularly a microturbine, and a second circuit in fluidic communication with a section upstream of the combustion device.

According to the present invention, the lambda ratio may reach values as high as 6-8, allowing a sufficient reduction in the temperature of the exhaust gases to be compatible with the turbine inlet. The apparent contradiction with what is required for flameless combustion is resolved through the optimized geometry of the combustion chamber which allows the oxygen to be diluted effectively in the mixture.

In general, the advantageous embodiments of each subject matter of the invention can also be applied to the other subject matters of the invention. As far as possible, each subject matter of the invention can be combined with the other subject matters. The subject matters of the invention can also be combined with the embodiments of the description, which in addition can be combined with one another.

The features specific to the invention are advantageous insofar as they make it possible to have a combustion device that is compatible with the use of different fuels such as natural gas, biogas, synthesized gas (syngas, etc.), etc. Furthermore, the flameless combustion is stable.

One embodiment of the combustion device proposed in the present invention has been specifically designed to accommodate large lambda values while at the same time allowing flameless combustion to occur.

Description of the Combustion Chamber

FIGS. 1 to 5 show one embodiment for a flameless combustion device 100 that receives preheated air from a heat recuperator (105, see FIG. 6) connected to a turbine, for example a microturbine, via an air-supply duct of appropriate dimensions and shape, typically cylindrical, so as to reduce pressure drops.

The air-supply duct may comprise an air-conveying duct 21 and an adapter duct 10 allowing this air-conveying duct 21 to be joined to a first end of the combustion device 100. The adapter duct 10 usually comprises, at one end, a fastening flange 22, particularly a V-shaped flange, for securing the air-conveying duct 21 to the adapter duct 10. The adapter duct 10 may, at its other end, have a flange referred to as main flange 23, which may be welded to a connecting tube. The adapter duct 10 allows access to the inside of the combustion device, as illustrated in FIG. 2.

At its other end, the combustion device 100 may be connected to the volute casing of the turbine (not depicted) via a conical tube 24 welded to an outer tube 26 of the combustion chamber 100. A V-shaped fastening flange 25 may provide the connection to the turbine volute casing.

Figure 1:
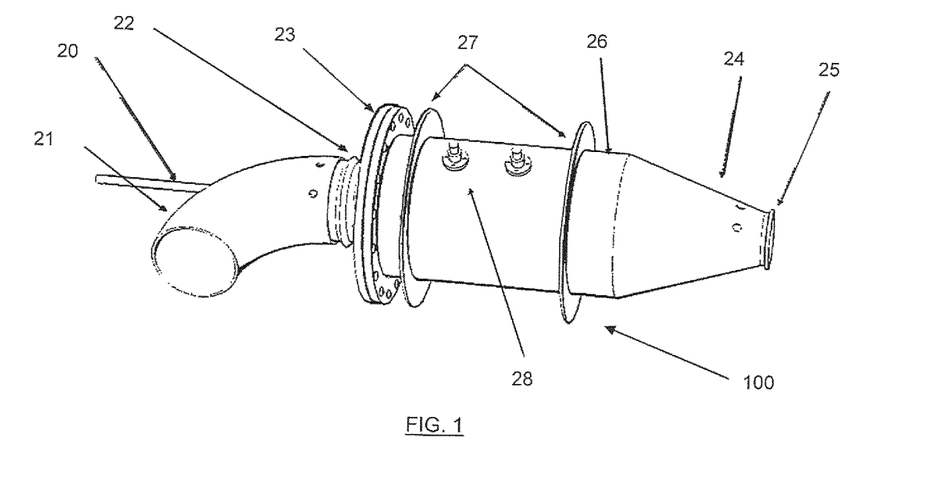
Figure 2:
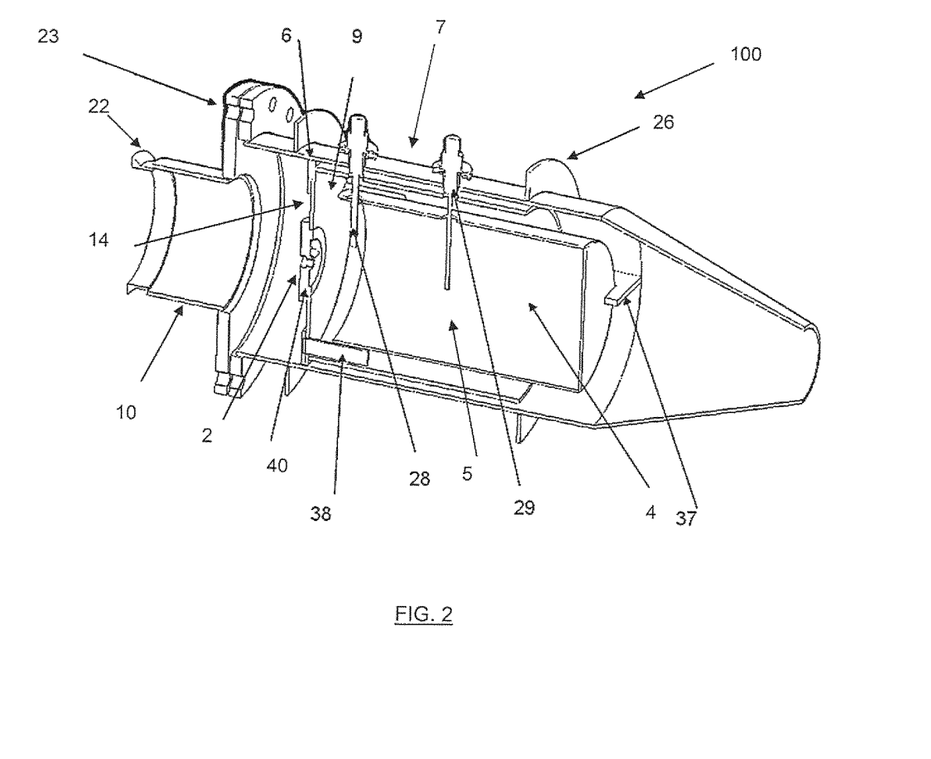

As illustrated in FIG. 2, the combustion device may comprise stiffeners 27 welded to the outer tube 26, the stiffeners 27 ensuring the rigidity of said device 100.

FIG. 2 also shows that the combustion device 100 can be ignited using a heater plug 28. The plug 28 passes through the outer tube 26, a tubular sleeve 7 and a combustion tube 5 in order to enter an ideal zone for the igniting of the mixture. This zone is preferably situated at a distance from air-injection means orifices 36 that is equivalent to the mean diameter defined by an internal surface 31 of an injection ring 40. What is more, this zone is preferably situated at a distance from the central axis of the combustion tube 5 that represents approximately ¾ of the mean diameter defined by the inner surface 31 of the injection ring 40.

The combustion device 100 may comprise a thermo-couple 29, preferably of the K type, also penetrating the heart of the combustion device 100 so as to measure the temperature in the combustion zone 4. This serves as a safety device in order to avoid excessive temperatures inside the combustion tube 5.

The combustion device 100 comprises fuel-injection means comprising a tube 20 passing through the air-intake duct 21. This tube 20 may be fixed, preferably welded, to a fuel-injection head 33. This tube 20 allows fuel to be conveyed as far as the injection head 33.

Figure 3:
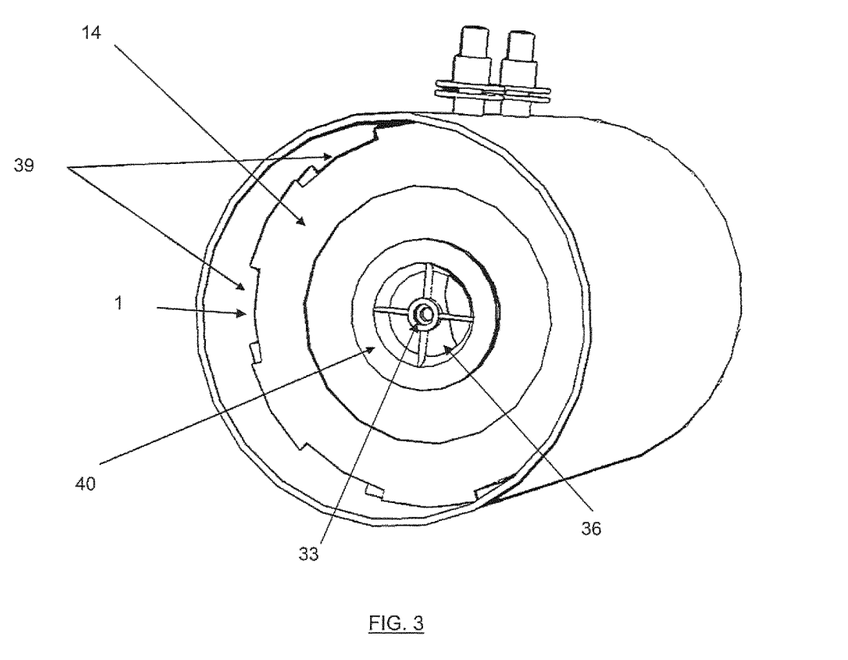
Figure 5:
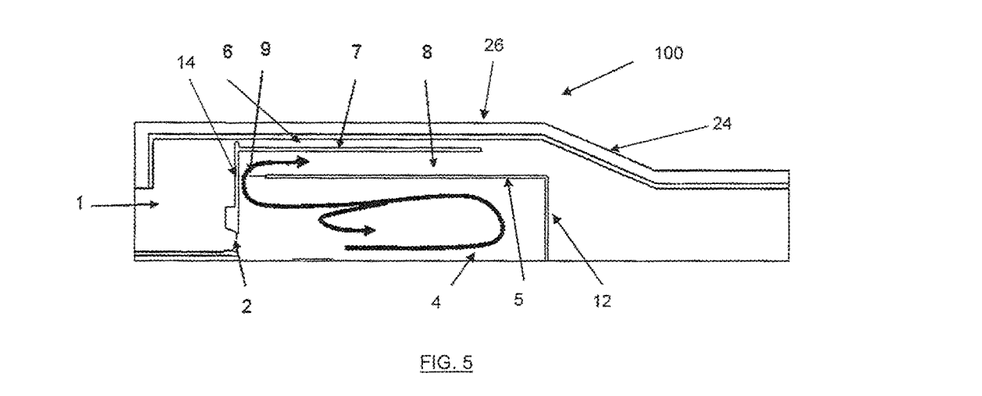

According to the invention, a technique of dividing/separating the incoming flow of air into two distinct air flows, a primary flow used for combustion and a secondary flow used for cooling the mixture. Thus, FIG. 3 shows that the combustion device 100 may comprise a plenum 1 used to divide the air flow into two flows: a primary flow and a secondary flow. The primary air flow may be injected into the combustion tube 5 by means of the orifices 36 of the air-injection means. The secondary air flow passes along the bypass 6 and mixes with the primary flow downstream (FIG. 5).

The bypass 6 allows the secondary flow to pass toward the downstream mixing zone. The bypass 6 may have openings 39, for example notches, the area of which makes it possible to regulate the ratio between the primary flow and the secondary flow. Typically, this ratio is equal to 1 so as to achieve a maximum lambda of 4 in the combustion zone 4.

Figure 4:
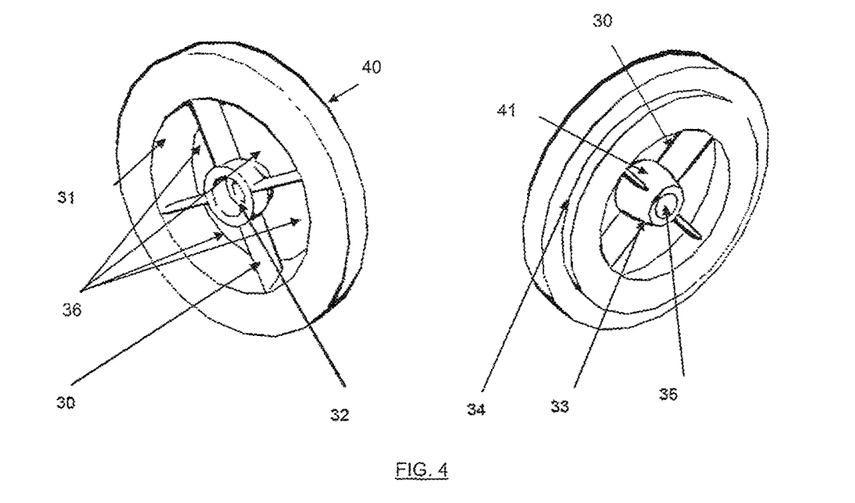

FIG. 4 illustrates more specifically the way in which the air-injection and fuel-injection means can be combined. In this configuration, the air-injection means comprise the injection ring 40 which has an inner surface 31 of substantially conical shape. According to this advantageous embodiment, that face of the injection ring 40 that faces toward the combustion tube 5 has a shoulder 34 to make it easier to fit into a closure wall 14, for example a plate, of the combustion tube 5. The fuel-injection head 33 may have an outer surface 41 of conical shape extending over the majority of its length. The fuel-injection head 33 may be kept at the center of the injection ring 40 by profiled arms 30 connected to the injection ring 40. The outer surface 41 of the fuel-injection head 33 may at least partly delimit the outer surface of the air-injection orifices 36. Profiling the arms 30 makes it possible to reduce the pressure drop brought about by the flowing of the air through the air-injection orifices 36. The conical inner surface 31 has an angle such that the primary air flow converges toward the combustion zone. The angles of the inner surface 31 of the injection ring 40 and of the outer surface 41 of the injection head 33 ensure the creation of ducts the cross section of which is convergent toward the combustion zone 4. The fuel-injection tube 20 is welded to the injection head 33 at a recess or shoulder 32 formed in the latter, so as to ensure a fluidtight connection. The fuel, preferably gas, is ejected from the injection orifice 35. As a preference, the means for a combined injection (namely of air and fuel) can be manufactured using an additive 3D printing process (for example DMLM, which stands for Direct Metal Laser Melting) in a refractory material, for example nickel-based or cobalt-based alloys or refractory steels. Alternatively, other processes are possible, such as machining, MIM (which stands for Metal Injection Molding), etc.

As illustrated in FIG. 4, the air and the fuel are respectively injected into the combustion tube 5 via the air 36 and fuel 35 orifices. This combustion tube has a cylindrical shape closed at its end by an end wall 12. In order to obtain flameless combustion, the velocity of the air flow needs to be between 60 and 120 m/s. The combustion gases are exhausted from the recombination zone 4 via one or more openings 9, for example a slot. However, a proportion of the fluid is recirculated in the combustion zone. The recirculation ratio is calculated on the basis of the formula mE/(mA+mF) greater than 1.3, where mE, mA and mF respectively denote the mass flow rates of the gases burnt and recirculated in the combustion zone 4, and of air and fuel introduced into the combustion zone 4. It is notably this substantial recirculation of the gases that allows the dilution of the oxygen and of the fuel and that leads to the emergence of the flameless combustion regime. The dimension of the openings 9 makes it possible to control the level of recirculation. Metal parts 37, 38 (see FIG. 2) may be used to position the combustion tube 5 in the outer tube 26 while at the same time fixing the passage cross section of the openings 9 (which in the example depicted are a slot 9). One of the parts 37, 38 may be welded to the outer tube 26 and thus allow the combustion tube 5 to expand freely.

It became apparent to the inventors, first of all experimentally and then by numerical verification, that the addition of a sleeve 7 makes it possible to greatly reduce the level of CO in the combustion gases downstream of the combustion device 100, this being when the combustion device 100 also comprises a bypass 6. The sleeve 7 is an open tube concentric with the combustion tube 5. This sleeve 7 makes it possible to avoid excessively rapid mixing between the primary flow and the secondary flow. Thus, the temperature of the primary flow remains high and the reaction whereby CO is recombined to $CO_2$ can take place further on in the zone 8 referred to as the recombination zone. The CO concentration in the combustion gases can thus be reduced by a factor of approximately 10. The length of the sleeve 7 therefore has an impact on the recombination of the CO and may advantageously be optimized through calculation. In any event, it is in general at least 50% of the length of the combustion tube 5. As a preference, the sleeve 7 is fixed to the closure wall 14.

The combustion tube 5 experiences extreme temperatures of the order of 1050° C. to 1150° C. There are various metal alloys that can be used for radiative tubes in heat treatment, such as 602CA®, 310S, Inconel® 625, and preferably the ferritic steel-chromium-aluminum alloy Kanthal® APM. It should be noted that the combustion tube 5 may equally have a hemispherical end wall or an end wall of some other shape making it possible to improve the recirculation of the gases and the drop in pressure in the combustion device.

The other parts of the combustion device 100 including, for example, the outer tube 26, the adapter duct 10, the flanges 22, 23 and the sleeve 7 may be made of steel 310S. The material needs to permit, like with any other combustion device, the application of a layer affording protection against high-temperature corrosion and oxidation. The combustion tube 5, the outer tube 26 and the sleeve 7 are preferably of cylindrical shape.

Description of the Electricity-Production or Energy-Cogeneration Apparatus

The flameless combustion device 100 may be associated with a microturbine application and notably one intended to produce electricity or heat using cogeneration. The electricity-production or cogeneration apparatus may comprise a number of modular elements (see FIG. 6). The apparatus comprises at least a turbine generator and a combustion device 100 which are combined with one or more of the following elements: a heat recuperator 105, a power electronics system (not depicted), a gas-water (or air-water) heat exchanger 103, an auxiliary unit (not depicted).

Figure 6:
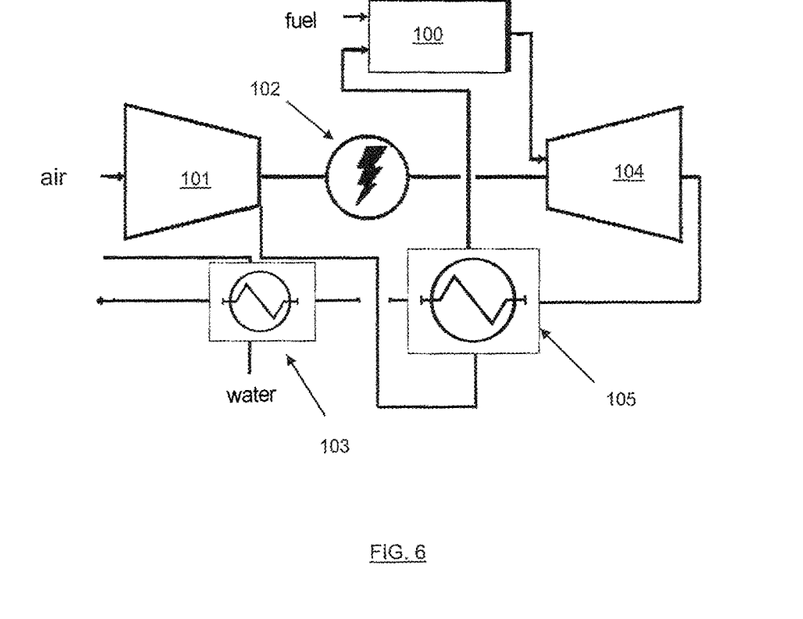
Figure 7:
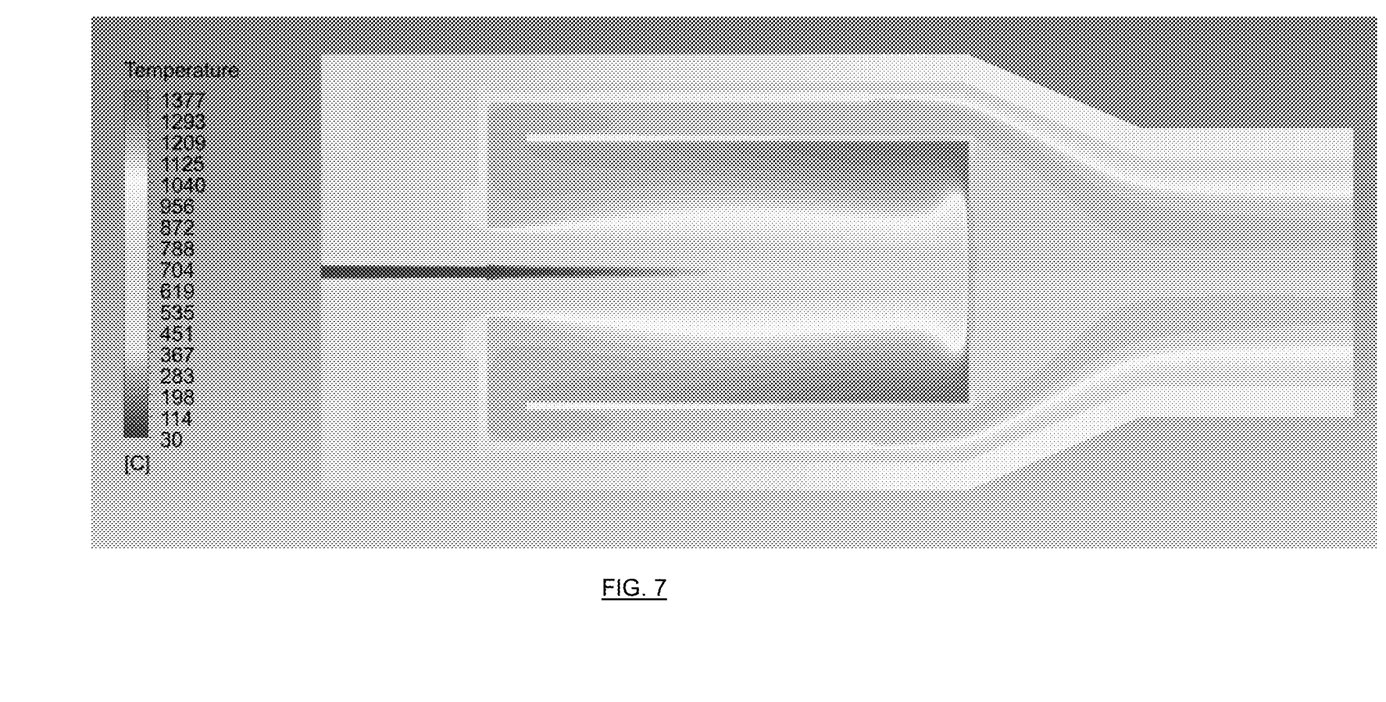
Figure 8:
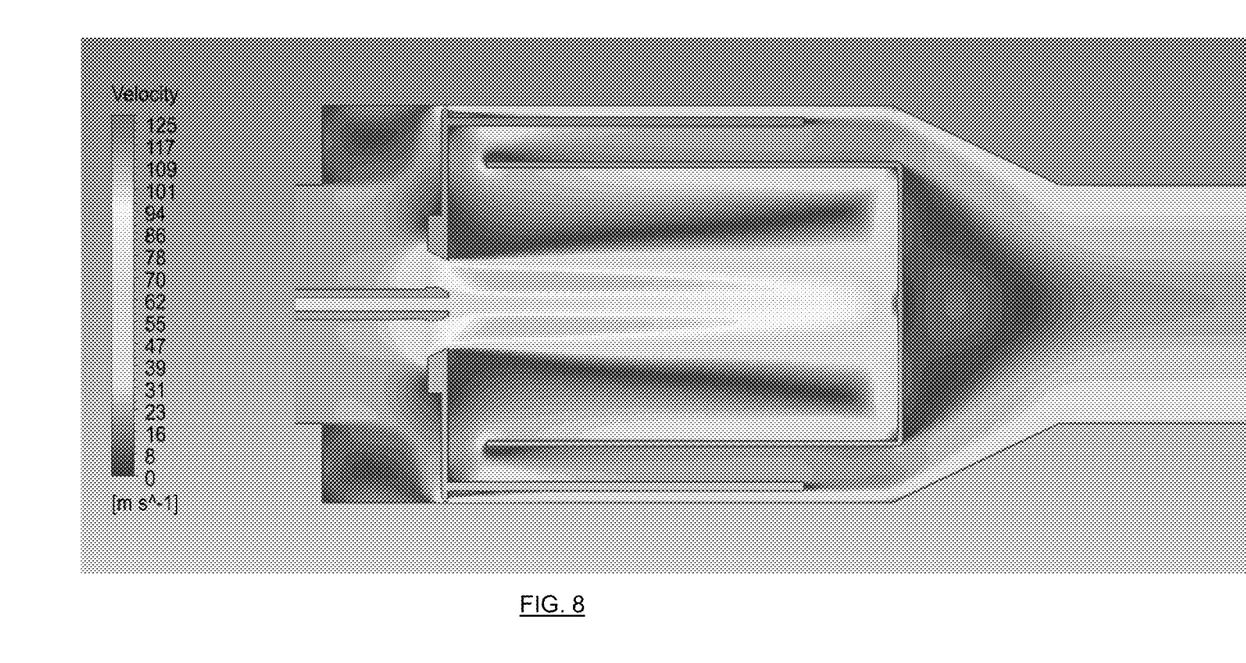

The turbine generator comprises a compressor 101, a turbine 104, for example a microturbine, an electric generator 102, preferably of permanent-magnet type, all fixed on the one same shaft. As a preference, the shaft bearings may comprise two radial aerodynamic rolling bearings requiring no lubrication with liquid or solid lubricant such as oil. In addition, the turbine generator may comprise an axial aerodynamic rolling bearing intended to compensate for the axial force of the compressor-turbine pair. The electric generator 102 may be positioned in front of the compressor 101, overhanging beyond same (not depicted). That configuration makes it possible to obtain a highly compact shaft. The electric stator is then fixed to the volute casing of the compressor. Sufficient space between the electric generator and the stator finally allows the compressor 101 to draw air in.

The heat recuperator 105 may comprise a heat exchanger intended to recuperate the usable energy present in the exhaust gases from the turbine 104 to preheat the air compressed by the compressor 101, which will be supplied to the combustion device 100.

The power electronics system (not depicted) may be configured in such a way that it is able to convert the high-frequency AC current produced by the generator 102 (synchronous AC motor, particularly of the permanent-magnet type) into DC current so that it can be injected into the electrical network using an inverter, for example of the kind used for solar applications.

A gas-water (or air-water) heat exchanger 103 may be positioned at the outlet of the cogeneration apparatus in order to recuperate the energy from the exhaust gases to heat water or produce steam in cogeneration mode. A number of exchangers may be used. What is more, each gas-water heat exchanger may be positioned at other points in the cogeneration apparatus that require cooling.

The auxiliaries unit performs the function of compressing and regulating the flow of the fuel, for example gaseous fuel, for injection into the combustion device 100 and systems for water cooling the electric stator and possibly the mounting for the aerodynamic bearings.

What is meant by a microturbine is a turbine of a power from 5 kW to 750 kW, preferably from 25 to 500 kW. Typically, these bearings are mounted on piston-type combustion engines to supercharge same.

Results of Simulation

The simulation results are set out in FIGS. 7, 8, 9 and 10. These were produced using the ANSYS 2020 R1 software. The approach was to solve axisymmetric Navier-Stokes (RANS) equations using the assumption of steady-state incompressible flow. The numerical modeling used an incompressible solver of the pressure-based type, equipped with a suitable model for turbulence (for example a standard k-ε model with the first constant $C_{1\varepsilon}$ equal to 1.6), a radiation model (Discrete Ordinate Method), a model of the interaction of the turbulence with the convection-diffusion equations for the chemical species specifically suited to flameless combustion (Eddy Dissipation Concept coupled with the Partially Stirred Reactor PaSR model) and a reactive gas model (for example KEE58, GRI 2.11, etc.). The simulations were run at the end of a mesh convergence study making it possible to demonstrate that the quality of the results becomes sufficiently independent of the mesh employed.

Figure 9:
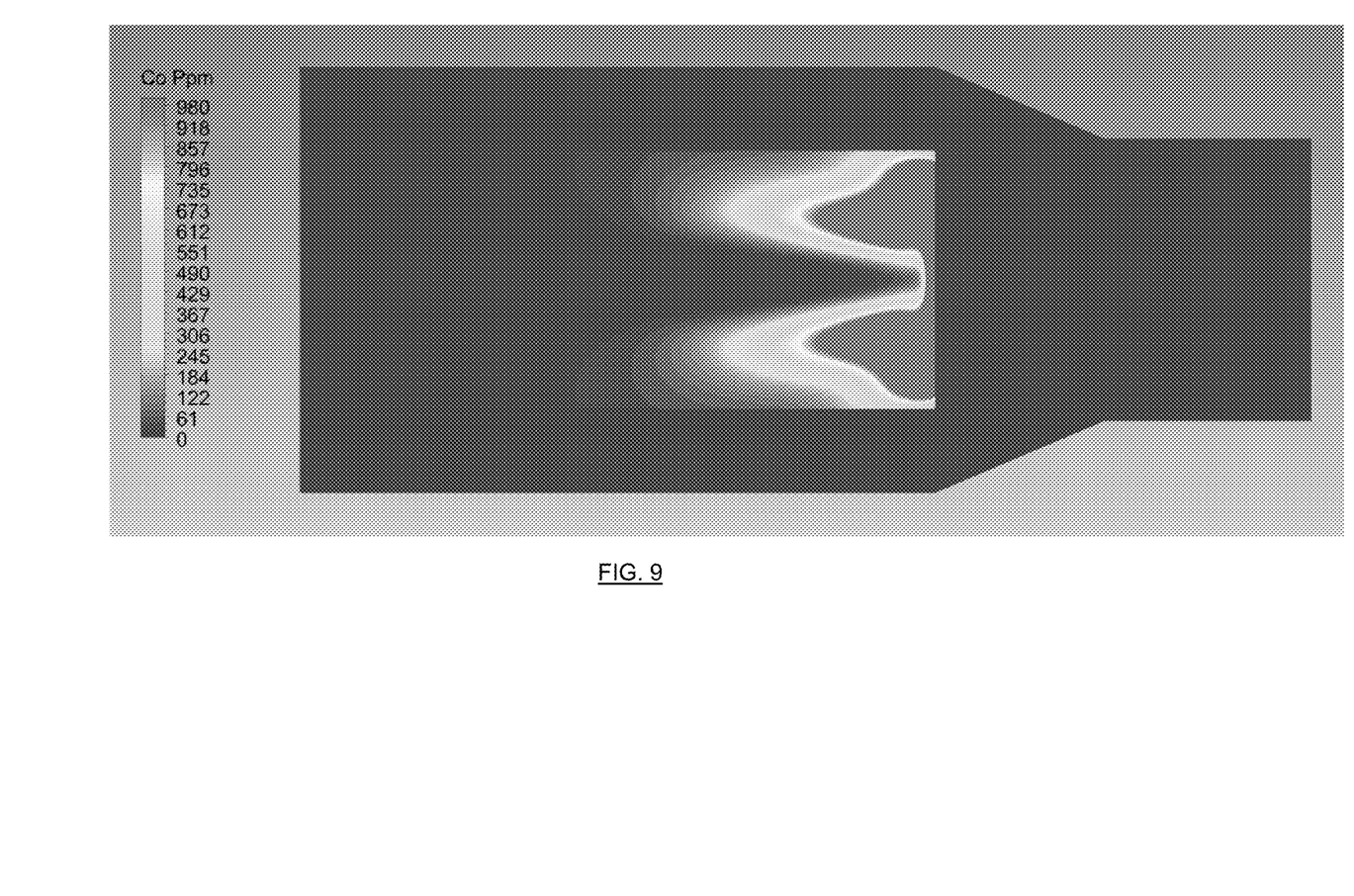
Figure 10:
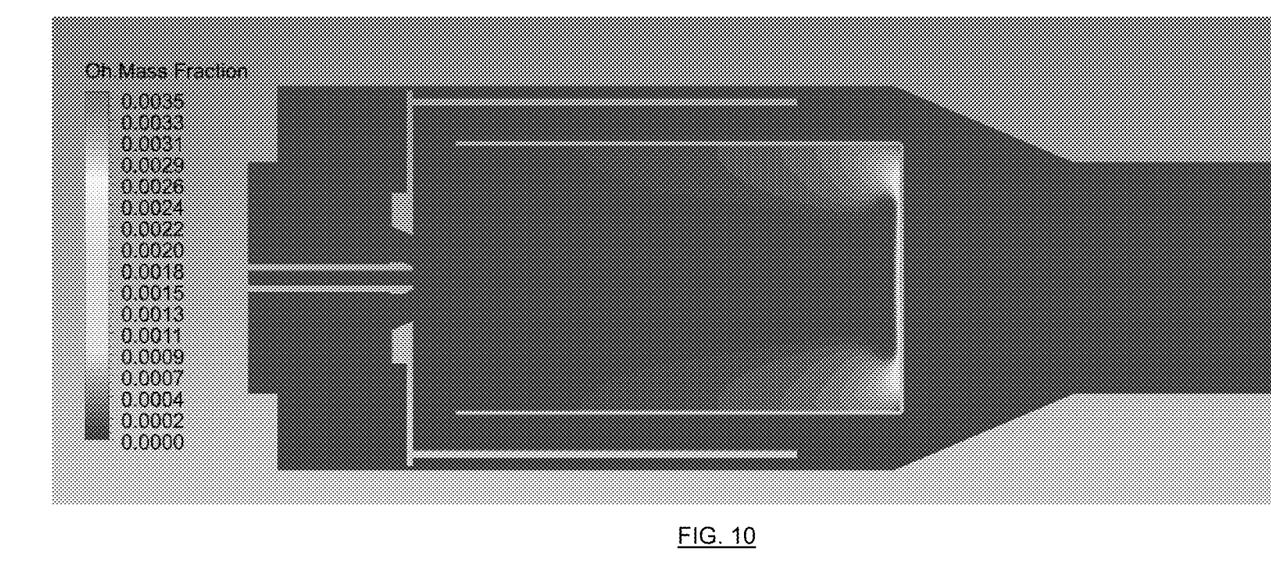

The temperature-field simulation (FIG. 7) shows that the maximum temperature attained does not exceed 1380° C., which is very much below the threshold triggering the production of NOx. The combustion zone is confined to the closed end of the combustion tube and is relatively dispersed, as witnessed by FIG. 10 which shows the distribution of the OH radicals. Moreover, the very high CO concentration in the combustion zone reduces very significantly under the effect of the recombination of CO to $CO_2$ (FIG. 9). The predicted emissions values in this particular instance are:

NOx=1.43 ppm;

CO=0.50 ppm.

A test rig was set in place in parallel in order to measure the performance of the flameless combustion chamber according to the present invention. This rig was equipped with a 30 kW electric air heater for preheating the air entering the combustion chamber. The emissions measurements were taken using a Testo 350, enabling measurements of CO (0-10 000 ppm) and NO (0-4000 ppm). The air flow rate was measured using a volumetric flow meter of the GasView make with a precision of ±3% error at full scale. The gas flow rate was adjusted using a flow rate controller of the Elflow type having a full scale accuracy of ±0.5%. The key measurement results are summarized in table 1.

TABLE 1

| Emissions measurements | |
|---|---|
| Emissions | Measurements mg/kWh at 0% $O_2$ [1] |
| CO | <10 [2] |
| $NO_x$ | 3.43 |

[1] Air flow rate 25 g/s, air temperature 650° C.
[2] Gas tested in accordance with EN 437

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Plenum
2 Injector
4 Combustion zone
5 Combustion tube
6 Bypass
7 Sleeve
8 Recombination zone
9 Opening(s), slot
10 Air supply duct, adapter duct
12 End wall
14 Closure wall, plate
20 Fuel-injection tube
21 Air supply duct, air conveying duct
22 Flange
23 Main flange
24 Conical tube
25 Flange
26 Outer tube
27 Stiffener(s)
28 Plug
29 Thermocouple
30 Profiled arms
31 Inner surface of the injection ring
32 Recess
33 Injection head, guide element
34 Shoulder
35 Fuel-injection orifice
36 Air-injection orifice
37 Metal positioning part
38 Metal positioning part
39 Bypass opening(s), notches
40 Injection ring
41 Outer surface of the guide element
100 Combustion device
101 Compressor
102 Electricity generator
103 Heat exchanger
104 Turbine
105 Heat recuperator (preheat exchanger)

The invention claimed is:

1. A combustion device for an electricity production or energy cogeneration apparatus, the electricity production or energy cogeneration apparatus comprising a gas turbine supplied by the combustion device, the combustion device being suitable for a flameless combustion regime, the combustion device comprising:
an outer tube;
a combustion tube forming a combustion zone for flameless combustion of a mixture of oxidizing air and fuel, the combustion tube being concentric with the outer tube, in communication with fuel-injection means, and in communication with air-injection means arranged at a first end of the combustion tube, referred to as a front end, and which is closed by an end wall at a second end of the combustion tube, referred to as a rear end, the end wall being secured to the combustion tube and fluid-tight,
the fuel-injection means comprising at least a first orifice, referred to as a fuel-injection orifice;
the air-injection means comprising at least a second orifice, referred to as an air-injection orifice;
means for discharging combustion gases; and
a closure wall covering the front end of the combustion tube and connected to the air-injection and fuel-injection means,
wherein
the combustion tube is substantially a cylinder with a single internal volume configured to allow the combustion gases to recirculate in the flameless combustion regime,
wherein the means for discharging the combustion gases comprise an opening arranged at the front end of the combustion tube, the opening being delimited, on one hand, by one end of a longitudinal cylindrical wall of the combustion tube proximal to the closure wall and, on another hand, by the closure wall, a flow and discharge of the combustion gases being between the longitudinal wall and the outer tube, and
wherein the combustion device further comprises a tubular sleeve arranged concentrically between the combustion tube and the outer tube, connected to the closure wall and positioned facing the opening so as to form an annular recombination zone, to extend a residence time of the combustion gases exhausted via the opening.

2. The combustion device of claim 1, wherein the outer tube delimits, at least in part with the combustion tube, an annular passage referred to as a bypass, allowing passage of a flow of dilution air to mix with the combustion gases downstream of the combustion zone, the closure wall comprising one or several openings, referred to as bypass openings, formed in a periphery thereof and via which the flow of dilution air enters the bypass.

3. The combustion device of claim 1, wherein the outer tube delimits, at least in part with the tubular sleeve, an annular passage, referred to as a bypass, allowing passage of a flow of dilution air to mix with the combustion gases downstream of the recombination zone, the closure wall comprising one or several openings, referred to as bypass openings, formed in a periphery thereof and via which the flow of dilution air enters the bypass.

4. The combustion device of claim 1, wherein the tubular sleeve extends axially over at least 50% of a length of the combustion tube.

5. The combustion device of claim 1, further comprising:
a plenum of cylindrical shape formed in part by a portion of the outer tube and by the closure wall, the portion being arranged at a front end of the outer tube, the closure wall forming an end wall of the plenum.

6. The combustion device of claim 5, wherein the plenum is fluidically connected to an air-supply duct.

7. The combustion device of claim 6, wherein the fuel-injection means comprise an injection head in which the fuel-injection orifice is formed.

8. The combustion device of claim 7, wherein the fuel-injection means comprise a fuel-injection tube, a rear end of which is secured to the injection head.

9. The combustion device of claim 8, wherein the air-supply duct and the fuel-injection tube are, over part of their respective lengths, arranged coaxially.

10. The combustion device of claim 7, wherein a guide element coincides with the fuel-injection head.

11. The combustion device claim 1, wherein the opening of the combustion gases discharge means comprises an annular opening formed between the closure wall and the one end of the longitudinal cylindrical wall of the combustion tube is a front edge of the combustion tube.

12. The combustion device of claim 1, wherein the fuel-injection orifice comprises an orifice centered with respect to the combustion tube.

13. The combustion device of claim 1, wherein the air-injection orifice comprises several orifices arranged in the closure wall.

14. The combustion device of claim 1, wherein the air-injection orifice encircles the fuel-injection orifice.

15. The combustion device of claim 1, wherein the air-injection means comprise an injection ring fixed to the closure wall.

16. The combustion device of claim 15, wherein the injection ring comprises an inner surface configured to guide a flow of air entering the combustion zone.

17. The combustion device of claim 16, wherein the air-injection means comprise a guide element arranged at a center of the injection ring.

18. The combustion device of claim 17, wherein the guide element comprises an outer surface configured to guide the flow of air entering the combustion zone, a portion of the outer surface being of substantially conical shape.

19. The combustion device of claim 18, wherein the guide element and the injection ring are connected by one or more profiled arms.

20. The combustion device of claim 1, further comprising:
a convergent conical tube secured to the outer tube and configured to discharge the combustion gases.

21. A method, comprising:
injecting a flow of air into the combustion device of claim 1 with a velocity of between 60 and 120 m/s, so as to obtain a fluid recirculation ratio mE/(mA+mF), where mE, mA and mF respectively denote mass flow rates of gases burnt and recirculated in the combustion zone, of the oxidizing air, and of the fuel which are introduced into the combustion zone.

22. The electricity-production or energy-cogeneration apparatus, comprising;
the combustion device claim 1.

23. The electricity-production or energy-cogeneration apparatus of claim 22, further comprising;
a heat exchanger configured to recuperate heat energy from the combustion gases produced in the combustion device in order to preheat intake air supplied to the combustion device.

24. The electricity-production or energy-cogeneration apparatus of claim 23, wherein the heat exchanger comprises a first circuit in fluidic communication with a section downstream of a microturbine, and a second circuit in fluidic communication with a section upstream of the combustion device.

* * * * *